US008005711B1

(12) United States Patent
Mackey

(10) Patent No.: US 8,005,711 B1
(45) Date of Patent: Aug. 23, 2011

(54) METHOD AND SYSTEM FOR SIMULTANEOUS DATA COLLECTION AND ANALYSIS OF MULTIPLE ATTRIBUTE RATINGS

(76) Inventor: Stephen W. Mackey, Purcellville, VA (US)

( * ) Notice: Subject to any disclaimer, the term of this patent is extended or adjusted under 35 U.S.C. 154(b) by 1303 days.

(21) Appl. No.: 11/538,530

(22) Filed: Oct. 4, 2006

Related U.S. Application Data

(60) Provisional application No. 60/725,571, filed on Oct. 11, 2005.

(51) Int. Cl.
*G06F 7/16* (2006.01)
(52) U.S. Cl. .......................................................... 705/10
(58) Field of Classification Search ..................... 705/10
See application file for complete search history.

(56) References Cited

U.S. PATENT DOCUMENTS

| | | | | | |
|---|---|---|---|---|---|
| 5,280,275 | A | * | 1/1994 | Kaplan | 345/157 |
| 5,452,410 | A | * | 9/1995 | Magidson | 345/440 |
| 5,893,098 | A | * | 4/1999 | Peters et al. | 707/10 |
| 6,876,788 | B2 | * | 4/2005 | Schroeder | 385/17 |
| 7,254,605 | B1 | * | 8/2007 | Strum | 709/203 |

OTHER PUBLICATIONS

Bechtel et al (Probabilistic Measurement of Attributes: A Logit Analysis by Generalized Least Squares), Dec. 1986, Marketing Science, vol. 5, No. 4, pp. 1-14.*
Handcockck et al (Improving Menu Placement Strategies for Pen Input), May 2004, Department of Computer Science, pp. 1-10.*

* cited by examiner

*Primary Examiner* — Romain Jeanty
(74) *Attorney, Agent, or Firm* — Whitham, Curtis, Christofferson & Cook, P.C.

(57) ABSTRACT

A display system and method for collecting respondent ratings of a concept on multiple attributes simultaneously, and using the same display mechanism for analysis of collected multi-attribute data. A graphical user interface presents concepts and instructions of a researcher and enables a respondent to evaluate each concept along two attributes simultaneously by positioning the concept on a surface having two degrees of freedom, one degree of freedom for each attribute. The simultaneous evaluation enables the respondent to consider interdependent relationships between the attributes. A graphical analysis interface allows the researcher to control display parameters and segment the collected data by respondent characteristics. Using the same display mechanism for collection and analysis enables analysis of data collected using legacy techniques.

16 Claims, 10 Drawing Sheets

METHOD AND SYSTEM FOR SIMULTANEOUS DATA COLLECTION AND ANALYSIS OF MULTIPLE ATTRIBUTE RATINGS

This patent application claims priority from U.S. Provisional application 60/725,571 filed on Oct. 11, 2005, which is incorporated by reference herein.

BACKGROUND OF THE INVENTION

1. Field of the Invention

This invention relates to a system and method of simultaneous data collection and analysis of multiple attribute ratings for the purposes of research and analysis.

2. Background Description

Market research is an important business tool, which permits manufacturers, retailers, financial institutions, and others to cost-effectively target their marketing and sales activities and efficiently reach potential customers. These organizations rely heavily on market data in planning new products, sales strategies and promotions, and when making a variety of other sales and marketing related business decisions.

In the past, marketing data has been collected in several ways. Typically, market research firms are employed to collect data using surveys, questionnaires, and other techniques. Typical surveys and questionnaires are a sequence of various question types. These questions types may be functionally defined as:

a) Open-ended questions whereby a respondent can write or type their response in a textual fashion in the language of their choice.

b) Single-choice questions whereby a respondent must choose one answer choice out of a set of pre-determined choices.

c) Multiple-choice questions whereby a respondent may choose zero, one, or more answer choices out of a set of pre-determined choices.

d) Grid questions whereby a respondent must choose one answer choice out of a set of pre-determined choices, the set being displayed in a series of rows or columns in conjunction with similar questions.

A typical implementation of a single-choice or grid question is to collect rating data for a respondent's perception of a concept attribute. The concept may be a textual description of a product or service, or a graphical display e.g. company logo, new product physical design. A question may be presented to the respondent e.g. "How do you feel about the following concept?" An instruction may be presented to the respondent e.g. "Please select an answer for the attribute." A set of pre-determined rating choices authored by the market research company is then presented to the respondent e.g.

a) "1—The product functions very poorly"
b) "2—The product functions somewhat poorly"
c) "3—The product functions as expected"
d) "4—The product functions somewhat better than expected"
e) "5—The product functions much better than expected"

Each pre-determined response is associated with a data point which is typically an integer representing the value of the response. The data point may then be stored in a database or computer memory for use in research and analysis.

This technique of presenting single-choice and grid questions has several drawbacks. First, it does not support a mechanism for the respondent to provide a response which might lie between the pre-determined choices e.g. "The product functions a little better than expected but not quite somewhat better than expected." From the respondent's perspective he or she would prefer to submit a data point of 3.5 corresponding to his or her true rating intent.

Furthermore, this technique does not permit a respondent to simultaneously rate multiple attributes due to the sequenced nature of a questionnaire. First, the respondent must consider and answer the question for one attribute. Secondly, the respondent must consider and answer the question for another attribute. This sequential process inherently limits the respondent's ability to consider and rate each attribute simultaneously thereby eliminating the potential for the respondent to consider a relationship between the two attributes. The collection and evaluation of these relationships may be critical to the research and analysis of the project as well as subsequent recommendations and strategies.

Moreover, current analysis and reporting techniques for the evaluation of data points and attribute relationships collected from a respondent or set of respondents known as a sample, from single-choice and grid questions do not provide a real-time method for graphical representation of the data. Typically a researcher must engage a data analyst to perform complex data segmentation commonly referred to as crosstabs, whereby a new data subset may be analyzed. This process is costly and time-intensive.

SUMMARY OF THE INVENTION

Accordingly, several objects and advantages of the present invention are:

a) to provide a graphical representation of multiple attribute rating scales;
b) to provide an interactive graphical user interface for a respondent to consider multiple attribute ratings;
c) to provide an interactive graphical user interface for a respondent to consider relationships between concept attributes;
d) to provide an interactive graphical user interface which can be administered using a computer with memory for processing and disk space for data storage;
e) to provide a system which can transmit data over a global computer network for storage in a remote database;
f) to provide an interface whereby a researcher can query the collected data points to create graphical representations of the simultaneous attribute ratings;
g) to provide an interface whereby a researcher can query the collected data points to create a subset of data points and graphical representations of the simultaneous attribute ratings according to the current subset.

Further objects and advantages are to provide a method for the novel exposure of previously undiscovered attribute relationships, which were not considered by respondents due to the inherently sequential and limiting nature of the prior art.

This invention relates to a system and method of simultaneous data collection and analysis of multiple attribute ratings for the purposes of research and analysis. More particularly this invention relates to an interactive graphical research method whereby a survey respondent can simultaneously consider and rate multiple concept attributes as well as interdependent relationships between these attributes. The system and methods of this invention provide for the collection of data using a computer or paper representation. Moreover, this invention provides for the graphical representation and analysis of the data irrespective of the means of data collection whether interactive graphical collection, paper collection, or other conventional collection techniques.

In one aspect, the invention is a method for collecting respondent ratings. The method presents a concept to a respondent, and provides to the respondent a display surface having a rating scale for a first attribute along a first degree of freedom and a rating scale for a second attribute along a second degree of freedom. This presentation enables the respondent to position a representation of the concept at a point on the display surface, the positioned point simultaneously defining ratings on both first and second attribute rating scales.

In another aspect of the invention the display surface is a rectangle defined by a horizontal axis corresponding to the first degree of freedom and a vertical axis corresponding to the second degree of freedom. A further aspect of this implementation provides that the first attribute rating scale is measured by a distance between the positioned point and the vertical axis drawn parallel to the horizontal axis, and the second attribute rating scale is measured by a distance between the positioned point and the horizontal axis drawn parallel to the vertical axis. In a further implementation, the display surface is a circle having a radius along an axis of the display surface, the first degree of freedom being a length of a line between the positioned point and a center of the circle and the second degree of freedom being an angle measured counterclockwise between the radius and the line.

It is also an aspect of the invention to further provide for using a display deck to present a plurality of concepts in a sequence determined by a researcher, where each concept is removed from the deck when positioned on the display surface by the respondent. In this implementation an instruction would be displayed for positioning concept representations on the display surface, and a button would be provided that enables the respondent to submit ratings on the concepts in the display deck.

Yet another aspect of the invention is to further provide for collecting ratings on the plurality of concepts from a plurality of respondents, each respondent being identified by segmentation data, including demographic data such as age and gender, where the researcher select respondents by categories of segmentation data. The age category can be further segmented into age range groupings. In this implementation of the invention the number of respondents included within the selected segmentation categories is displayed on the display surface. Further, the researcher selects a statistical formula, such as mean or median, for aggregating rating data on the concepts for the selected respondents, and then each concept is displayed at a point on the display surface defined by the aggregated ratings on the first and second attribute rating scales. It is yet another aspect of the invention to provide a graphical user interface that enables the researcher to change one or more of the selected segmentation categories and statistical formula and redraw the display on the display surface in accordance with these changes, which can be changed again and again until the researcher has fully analyzed the data.

In its best mode the invention is implemented by gathering data using a graphical user interface as described below with respect to the figures, but the simultaneous multi-attribute display aspect of the invention can be implemented in the data collection phase by use of paper media, which can then be entered into a system where a researcher is then able to use the best mode graphical display surface for analysis and presentation of aggregate data. Further, while the best mode of implementation provides for continuous rating scales, the best mode can be approximated by use of grid layouts and other techniques for segmenting choices available to respondents, or for segmenting the data available to the researcher.

BRIEF DESCRIPTION OF THE DRAWINGS

The foregoing and other objects, aspects and advantages will be better understood from the following detailed description of a preferred embodiment of the invention with reference to the drawings, in which:

FIG. 6 is a display of an exemplar worksheet showing selection of configuration parameters for the display of multi-attribute rating data provided in FIG. 5;

FIG. 8 is a display of an exemplar worksheet, as in FIG. 6, showing selection of configuration parameters for the display of multi-attribute rating data provided in FIG. 7;

DETAILED DESCRIPTION OF A PREFERRED EMBODIMENT OF THE INVENTION

Figure 1:
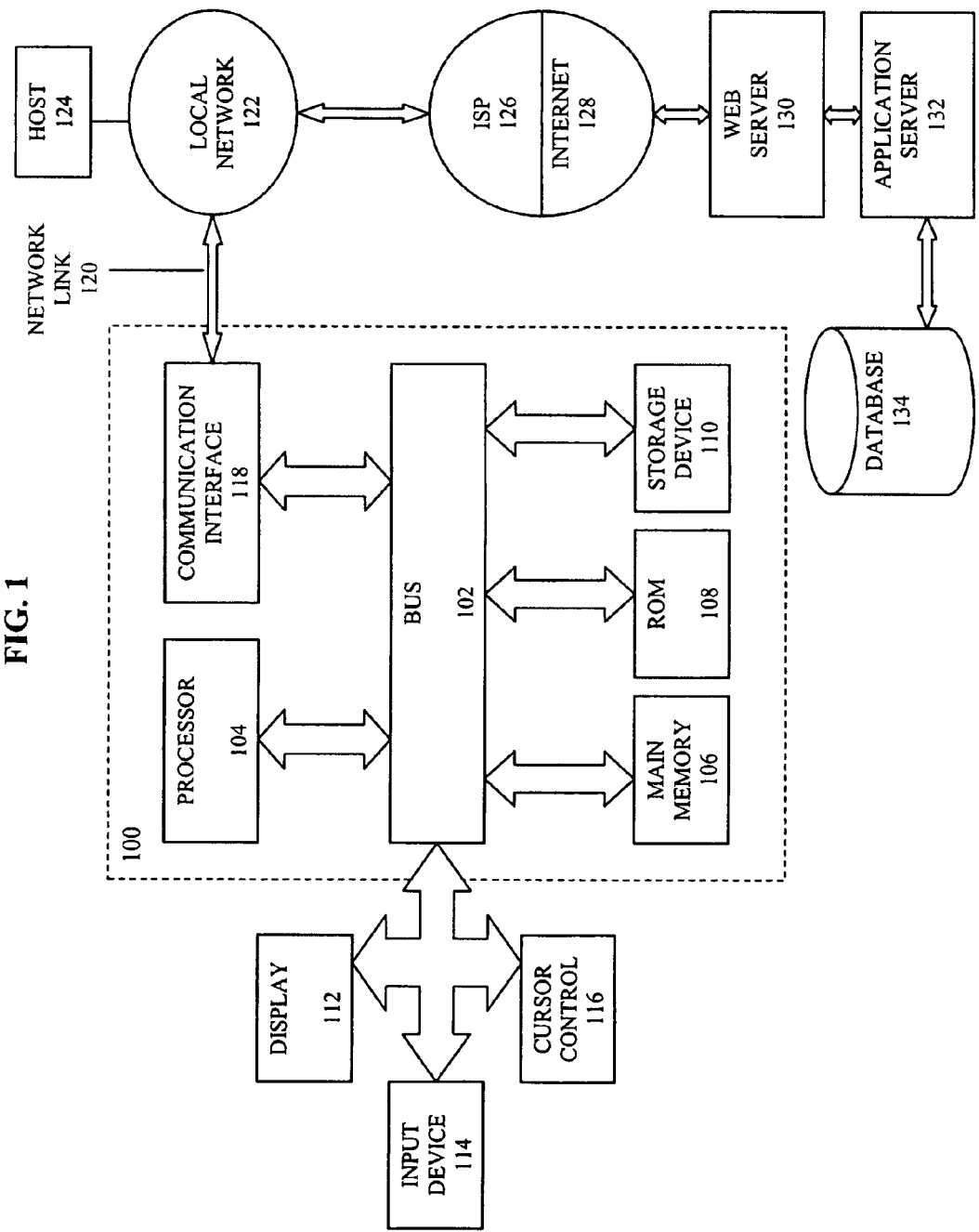
FIG. 1 is a block diagram of a computer system and global computer network upon which an embodiment of the invention may be implemented.

Referring now to the drawings, and more particularly to FIGS. 1-8, the following Table 1 describes the reference numerals given in the Figures:

TABLE 1

| 100 | respondent computer system | 102 | bus |
|---|---|---|---|
| 104 | processor | 106 | main memory |
| 108 | read only memory | 110 | storage device |
| 112 | display | 114 | input device |
| 116 | cursor control | 118 | communication interface |
| 120 | network link | 122 | local network |
| 124 | host computer | 126 | internet service provider |
| 128 | internet | 130 | web server |
| 132 | application server | 134 | database |
| 210 | concept staging area | 212 | attribute 2 rating scale |
| 213 | neutral position | 214 | attribute 1 rating scale |
| 216 | question | 218 | instruction |
| 220 | rating area | 230 | response submission button |
| 310 | concept 1 interim location | 312 | concept 2 interim location |
| 314 | concept 3 interim location | 410 | concept 4 final location |
| 412 | concept 5 final location | 414 | concept 6 final location |
| 510 | concept 1 analysis location with partial transparency | | |

TABLE 1-continued

| | | | |
|---|---|---|---|
| 512 | concept 2 analysis location with no transparency | | |
| 514 | concept 3 analysis location with partial transparency | | |
| 516 | concept 4 analysis location with no transparency | | |
| 518 | concept 5 analysis location with no transparency | | |
| 520 | concept 6 analysis location with partial transparency | | |
| 610 | stimulus column | 612 | order column |
| 614 | stimulus visibility configuration | 616 | segmentation query configuration |
| 618 | segmentation query sample base | | |
| 710 | concept 1 analysis location with partial transparency | | |
| 712 | concept 2 analysis location with no transparency | | |
| 714 | concept 5 analysis location with no transparency | | |
| 716 | concept 6 analysis location with partial transparency | | |
| 812 | order column | 814 | stimulus visibility configuration |
| 816 | segmentation query configuration | 818 | segmentation query sample base |

A system and method of simultaneous data collection and analysis of multiple attribute ratings for the purposes of research and analysis is described. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Hardware Overview

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device has two degrees of freedom, typically in two perpendicular axes: a first axis (e.g., x) and a second axis (e.g., y), that allows the device to specify positions in a plane. However, the input device may utilize any other system for specifying positions in the plane, including the radian coordinate system.

The interactive data collection graphical user interface is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector can receive the data carried in the infrared signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a Web server 130 might transmit a requested code for an application program through Internet 128, ISP 126, local network 122 and communication interface 118. The Web server 130 may store and retrieve data from database 134 through the application server 132.

Processor 104 may execute the received code as it is received, and/or stored in storage device 110, or other non-volatile storage for later execution. In this manner, computer system 100 may obtain application code in the form of a carrier wave.

Interactive Respondent Data Collection Graphical User Interface

Figure 2:
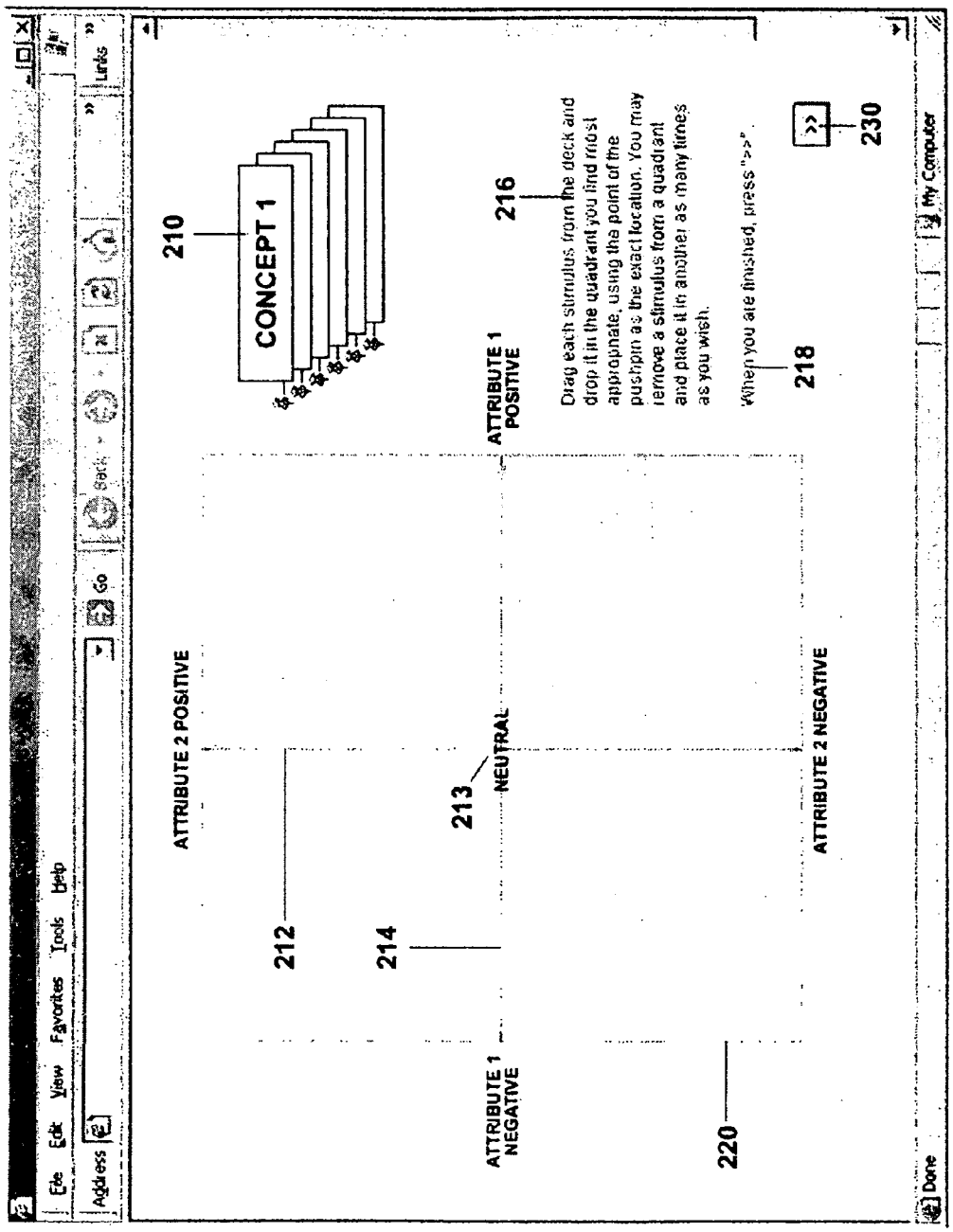
FIG. 2 is an exemplar display of the invention's interactive graphical data collection interface.

FIG. 2 illustrates one embodiment of a graphical user interface used to permit a respondent to interactively rate multiple concept attributes. In FIG. 2, a set of any number of concepts to be rated is placed in a staging area 210 outside of the rating area 220. The rating area 220 may be defined and delineated by any geometrical shape including but not limited to a square, rectangle, or circle. The rating area 220 consists of multiple attribute rating scales in a vertical configuration for attribute two 212 and a horizontal configuration for attribute one 214. Rating area 220 may be delineated by a different color or pattern to clearly indicate to the respondent the limits of the rating area.

Instruction 216 prompts the respondent to manipulate the concept 210 in the manner desired by the researcher. Instruction 216 texts may be unique and tailored in accordance with each data collection project. In the example given in FIG. 2, the rating area 220 is a two dimensional grid showing a first attribute along horizontal axis 214 from a negative end on the left side of the rating area 220 to a positive end on the right side of the rating area 220. A second attribute is shown along a vertical axis 212 from a negative end at the bottom of the rating area 220 to a positive end at the top of the rating area 220. A neutral position 213 for each attribute is located at the intersection of horizontal axis 214 and vertical axis 212 at the center of rating area 220. Instruction 218 advises the respondent how to conclude the drag-and-drop manipulations described in instruction 216. In the example given in FIG. 2, instruction 218 advises the respondent to select button 230 when finished. Instruction 218 texts may be unique and tailored in accordance with each data collection project.

While the example shown in FIG. 2 uses standard Cartesian coordinates to relate two attributes to a concept, those skilled in the art will appreciate that particular attribute relationships may be expressed more artfully using other coordinate systems, e.g. a first attribute may be strongly (length=+1) or weakly (length=−1) associated with a concept, while a second attribute may be in sync (angle=0 degrees) or out of sync (angle=180 degrees) with the concept.

Figure 3:
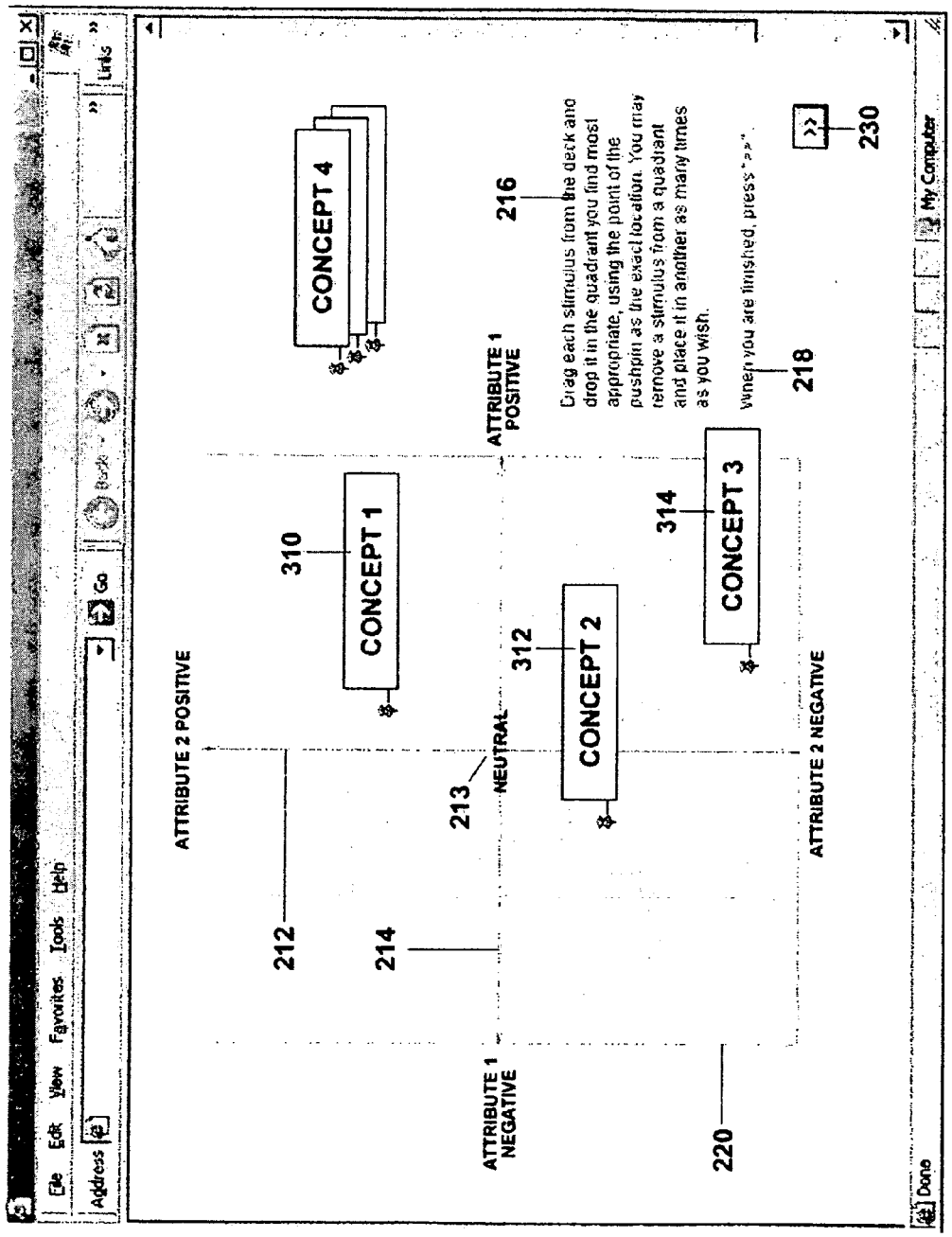
FIG. 3 is an exemplar display of the interface shown in FIG. 2 at an interim state while respondent's multiple attribute rating data is being collected.

FIG. 3 illustrates the status of rating area 220 and concept deck 210 when the respondent has partially completed the ratings desired by the researcher. Concept one 310, concept two 312 and concept three 314 have been moved from concept deck 210 onto rating area 220 in accordance with the respondent's perception of where each concept should be placed along the axis associated with each attribute, that is, at a position (x, y) on rating area 220 which is a distance "y" above (positive) or below (negative) the horizontal axis 214 running through neutral position 213, and a distance "x" to the right (positive) or left (negative) of the vertical axis 212 running through neutral position 213.

It will be noted, for example, that concept one 310 has been placed above the horizontal axis 214 and slightly to the right of the vertical axis 212, indicating to the researcher that the user has a positive impression of concept one 310 with respect to both attribute one and attribute two. Similarly, concept two 312 has been placed below horizontal axis 214 and to the left of vertical axis 212, indicating the user has a negative impression of concept two, 312 with respect to both attributes. Concept three 314 has been given a positive rating as to attribute one (by being located to the right of vertical axis 212) but a very negative rating as to attribute two (by being located well below horizontal axis 214).

The system provides the interactive functionality whereby the respondent can select and hold a concept (e.g. 310, 312, 314), move the concept to another location and then release the concept. This technique may be referred to as drag and drop. The system application may be implemented in Dynamic Hypertext Markup Language DHTML consisting of the synergy of Hypertext Markup Language HTML, JavaScript, and Cascading Style Sheets CSS. Additionally the system application may be implemented in Macromedia Flash, or other animation-enabling software application.

Figure 4:
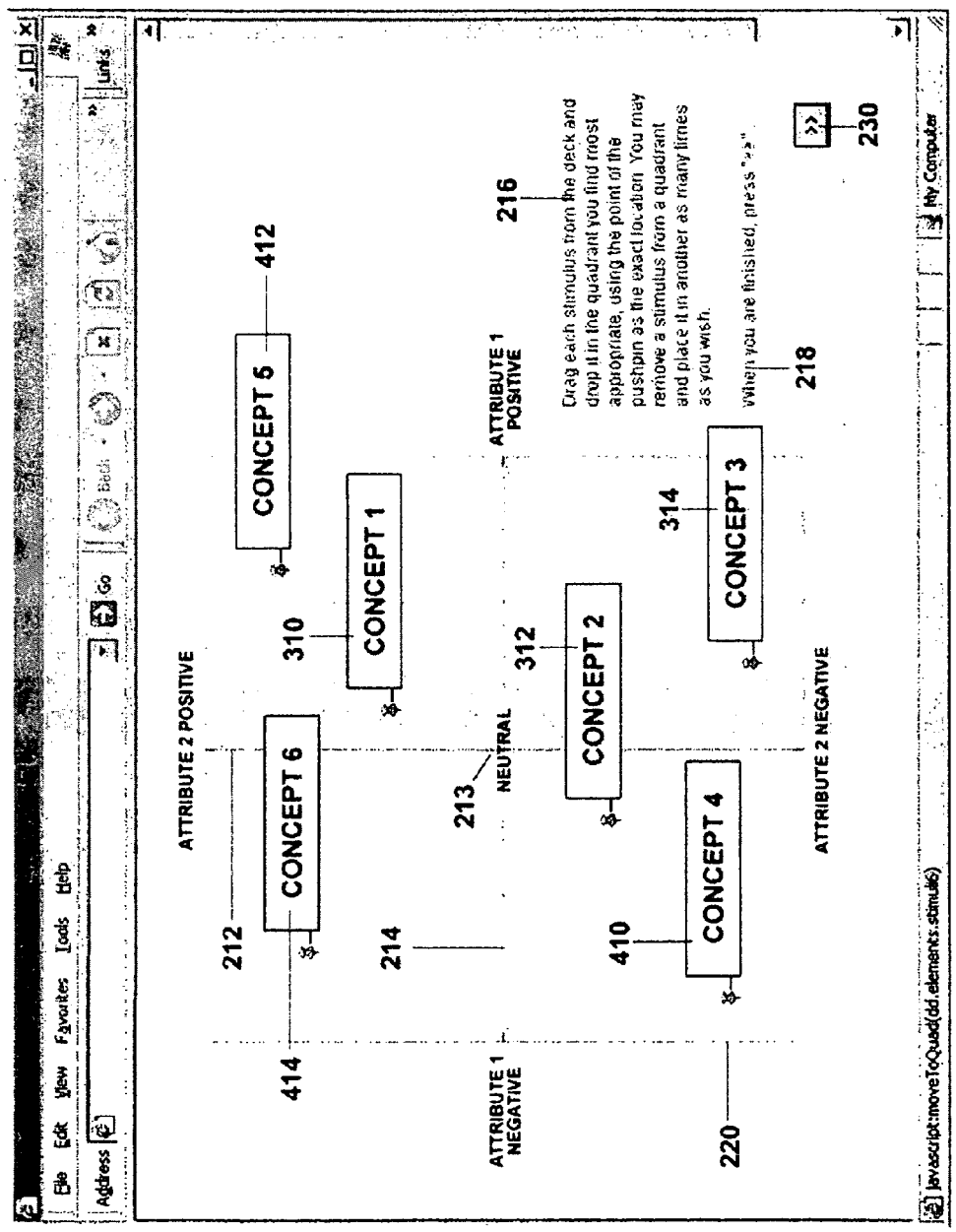
FIG. 4 is an exemplar display of the interface shown in FIGS. 2 and 3 just prior to respondent's submission of the collected multiple attribute rating data.

FIG. 4 illustrates one embodiment of a graphical user interface used to permit a respondent to interactively rate multiple concept attributes. In FIG. 4, a respondent has completed the interactive portion of the rating exercise shown in FIG. 3. As shown, the respondent has selected, moved, and released concept four 410 onto the rating area 220. Similarly, the respondent has selected, moved, and released concept five 412 onto the rating area 220. Lastly, the respondent has selected, moved, and released concept six 414 onto the rating area 220.

According to instruction 218, when finished the respondent must submit the data for collection by pushing button 230. In addition, the application may perform validation on the respondent's activity according to the research question design and data collection specification. Such validation may include but not be limited to verification that each concept presented to the respondent has been placed inside the rating area 220 and that no concept remains in the staging area 210 or other portion of the browser window outside of the rating area 220. This validation routine may be implemented in JavaScript or ActionScript or other client-side application programming language and is instantiated upon pressing button 230.

The final position of each concept may be known to the device by degrees of freedom in two axes, a first axis (e.g., x) and a second axis (e.g., y), that allows the device to specify positions in a plane. However, as noted above, the input device may utilize the radian coordinate system—or any method convenient for tracking movement of a pointing device—to specify positions in a plane. Upon successful data validation the final position of each concept is recorded and transmitted according to FIG. 1 whereby computer system 100 will send messages and data, including program code, through the network(s), network link 120 and communication interface 118. A Web server 130 will send the data through the application server 132 to store the data in database 134. Application server 132 is programmed to execute application languages including but not limited to PHP, ASP, TCL, Cold Fusion, and Java.

Database 134 may be based on any number of known database management systems (DBMS), including hierarchical databases, network databases, relational databases, and object-oriented databases. Suitable DBMS are widely available and include Oracle, Sybase, Microsoft SQL Server, and DB2. One suitable database system is a relational database based on SQL language. A suitable SQL database would typically include a Data Definition Language (DDL) for creation of a new database and new objects within an existing database; a Data Manipulation Language (DML) for processing existing database objects; and a Data Control Language (DCL) for administering permissions and other security-related issues. The data processing is handled by a database engine database and can be accessed by various searching means, including Boolean logic evaluation, proximity calculations, and fuzzy logic evaluation. The databases of the present invention may also be custom designed, the design process and features being well within the skill of persons in the art. Database columns associated with each respondent may include but not be limited to a unique respondent identification field, x and y or radian coordinates for each concept's final location, time, and date.

Research Interface and Graphical Analysis Representation

Figure 5:
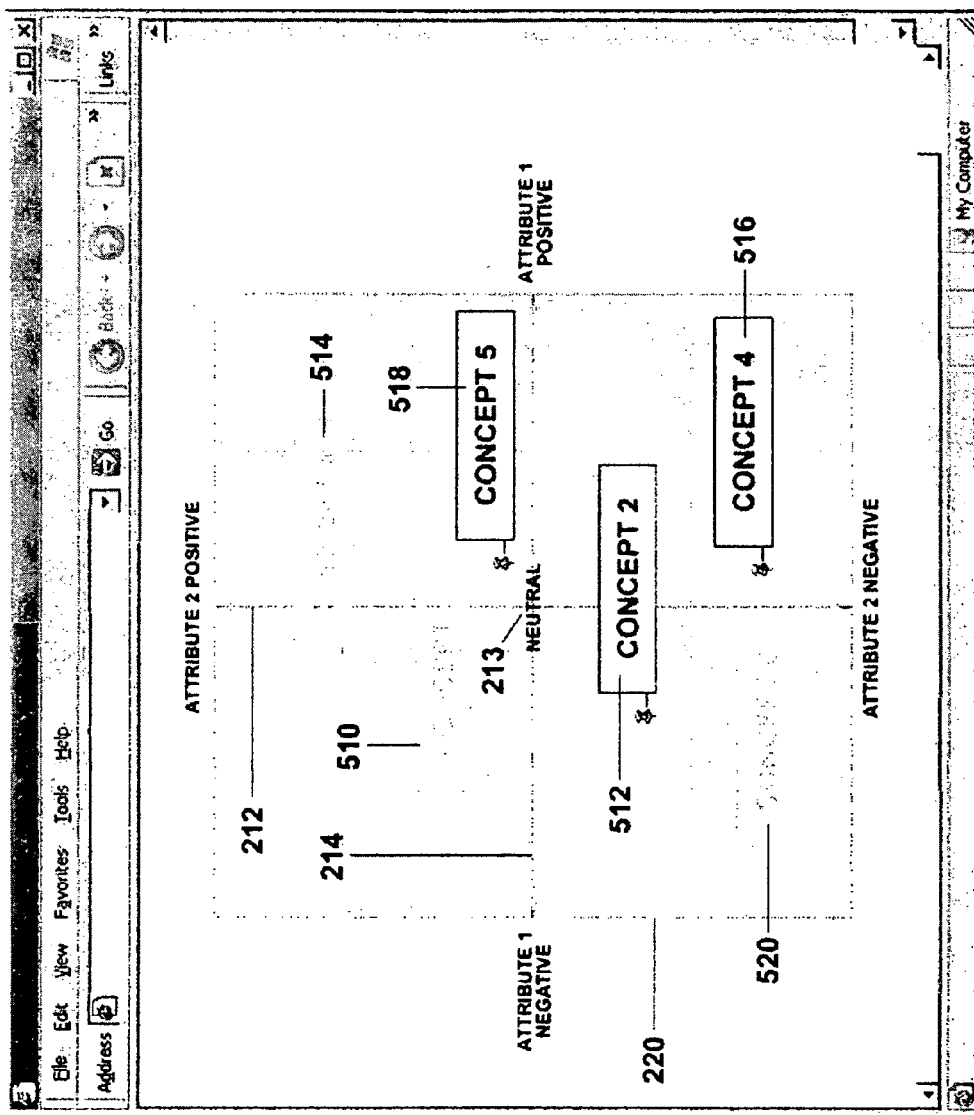
FIG. 5 is an exemplar display, on the rating area shown in FIGS. 2-4, of results of analysis of data collected from a plurality of respondents, with associated representation configuration parameters enabled.

FIG. 5 illustrates a graphical analysis representation of data collected from respondents, as calculated by a query configured by a research interface. In FIG. 5, the concepts presented to and interactively rated by the entirety of the sample population are presented to a researcher according to the average position of each concept across the entire sample population. The average position of each concept may be determined by performing an appropriate database query on the data set as submitted by respondents. In addition to or in place of an average calculation, the research design may specify another statistical formula to calculate each concept's position, the formulae including but not limited to mean and variance calculations. The queries of the present invention may also be custom designed, the design process and features being well within the skill of persons in the art.

Figure 6:
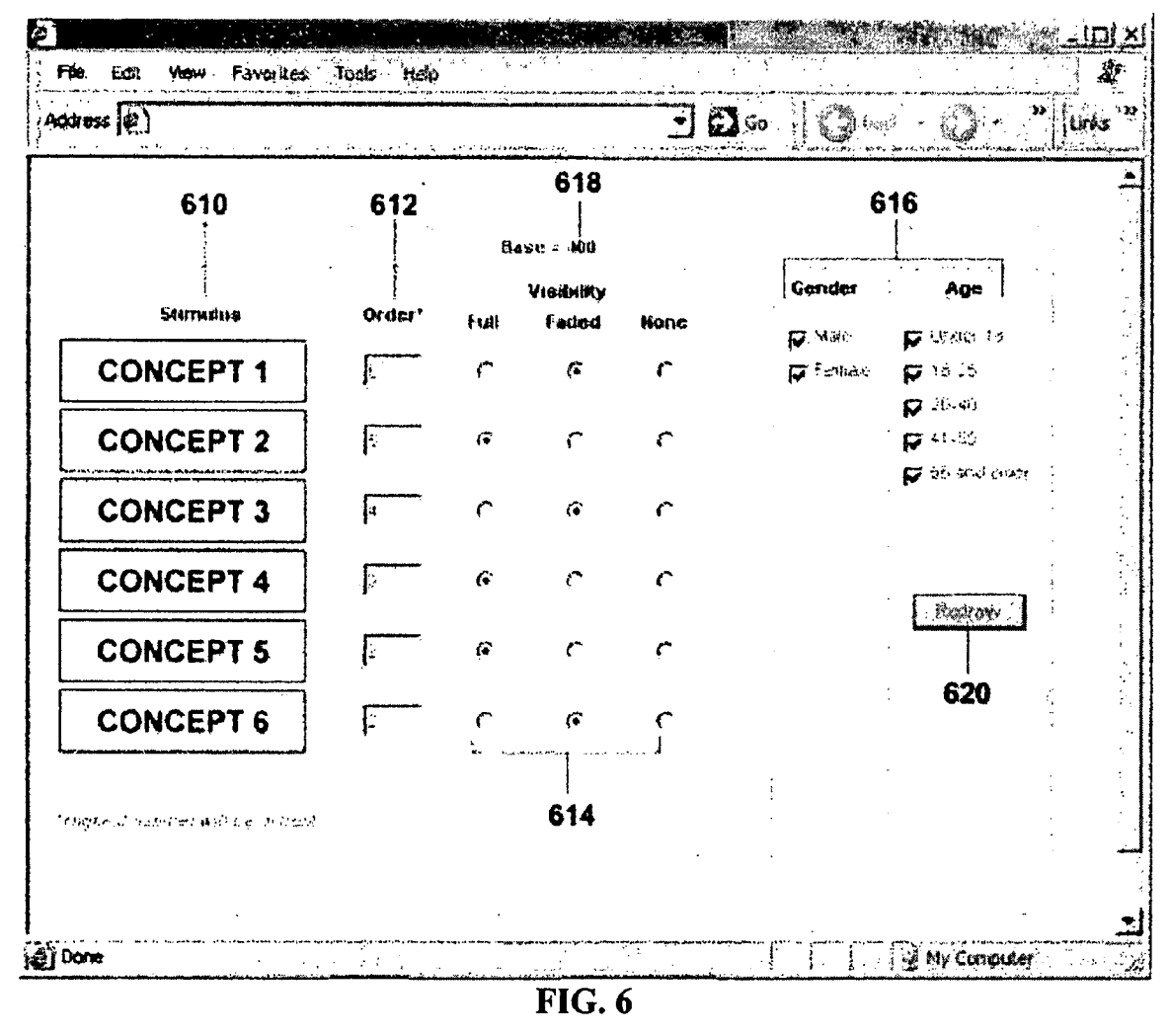

According to the database query result set concept one 510 is positioned on the rating area 220, indicating that the average rating for concept one 510 was negative for attribute one 214 and slightly positive for attribute two 212. Further, concept one 510 is presented with a faded visibility (as shown by the dashed line) according to the visibility configuration parameter 614 in FIG. 6. The configuration parameters for the display are determined by the researcher, as shown in FIG. 6. Furthermore, the average ratings for concept three 514 and concept six 520 are also presented with partial transparency (at locations representing average ratings for the attributes) according to the visibility configuration parameter 614 in FIG. 6 as determined by the researcher. Lastly, concept two 512, concept four 516, and concept five 518 are presented at their calculated locations fully opaque according to the visibility configuration parameter 614 in FIG. 6 as determined by the researcher.

The faded visibility configuration may be implemented as a partial transparency in Dynamic Hypertext Markup Language DHTML, for example. It should be noted that DHTML consists of the synergy of Hypertext Markup Language HTML, JavaScript, and Cascading Style Sheets CSS. Additionally the system application may implement partial transparency in Macromedia Flash, or other animation-enabling software application.

Upon review of the concept locations, a researcher using the invention is now able to analyze the results of the data collection for the selected sample. According to attribute one scale 214 and attribute two scale 212 in this exemplar respondent set graphical result, concept five 518 is the singular concept rated positive along both axes. Inversely, concept two 512 rated negative along both axes as did concept six 520. Upon inspection it is clear to a researcher using the invention that although both concept two 512 and concept six 520 were both rated negatively along both axes, concept six 520 is perceived by respondents as the more negative concept.

Possible Researcher Segmentation Query and Representation Configuration

FIG. 6 illustrates one implementation of a research interface for configuring a query for the display of data described above with respect to FIG. 5. In FIG. 6, each concept presented as a stimulus to the entirety of the sample population for interactive multi-attribute rating is displayed in column 610. In some situations the location of different concepts may be so close that the concept labels would overlap. Front-to-back ordering 612 of each concept provides for this situation, allowing the researcher to place particular concepts in front of others on the display. Those skilled in the art will appreciate that other techniques may be used to mitigate situations where concept labels interfere with the analysis, including controlling the visibility 614 of each concept. Such visibility control 614 may include but not be limited to the selection of a pre-determined visibility parameter for each concept, e.g. full opaqueness, partial opaqueness, partial transparency, and no visibility.

Segmentation of the sample respondent set may be provided using an aspect 616 of the query configuration interface of FIG. 6 whereby a researcher may choose to limit the graphical representation of each concept to specific subsets of the sample as determined by other data points collected during the scope of the project. For the purposes of this invention, these other data points will be referred to collectively as "segmentation data". For example, these data points may include demographic information about the respondents such as gender, age, household income, ethnicity, and region, as well as concept related evaluations such as brand awareness, brand usage, and purchase intent. The segmentation options 616 shown in the exemplar are gender and age. The segmentation aspect of the interface presents a researcher skilled in the art with a powerful analysis system.

A data set query will return a set of respondent data consisting of a whole number of respondent records. To mitigate the possibility that a custom query may select segmentation subsets containing zero records, and to enable a researcher skilled in the art to perform complex analyses according to market research methodologies, the number of records corresponding to a selected segmentation subset is displayed as the base 618. Upon completion of the desired query configuration a researcher initiates display or redrawing of a graphical analysis representation of the data by pressing button 620.

Figure 7:
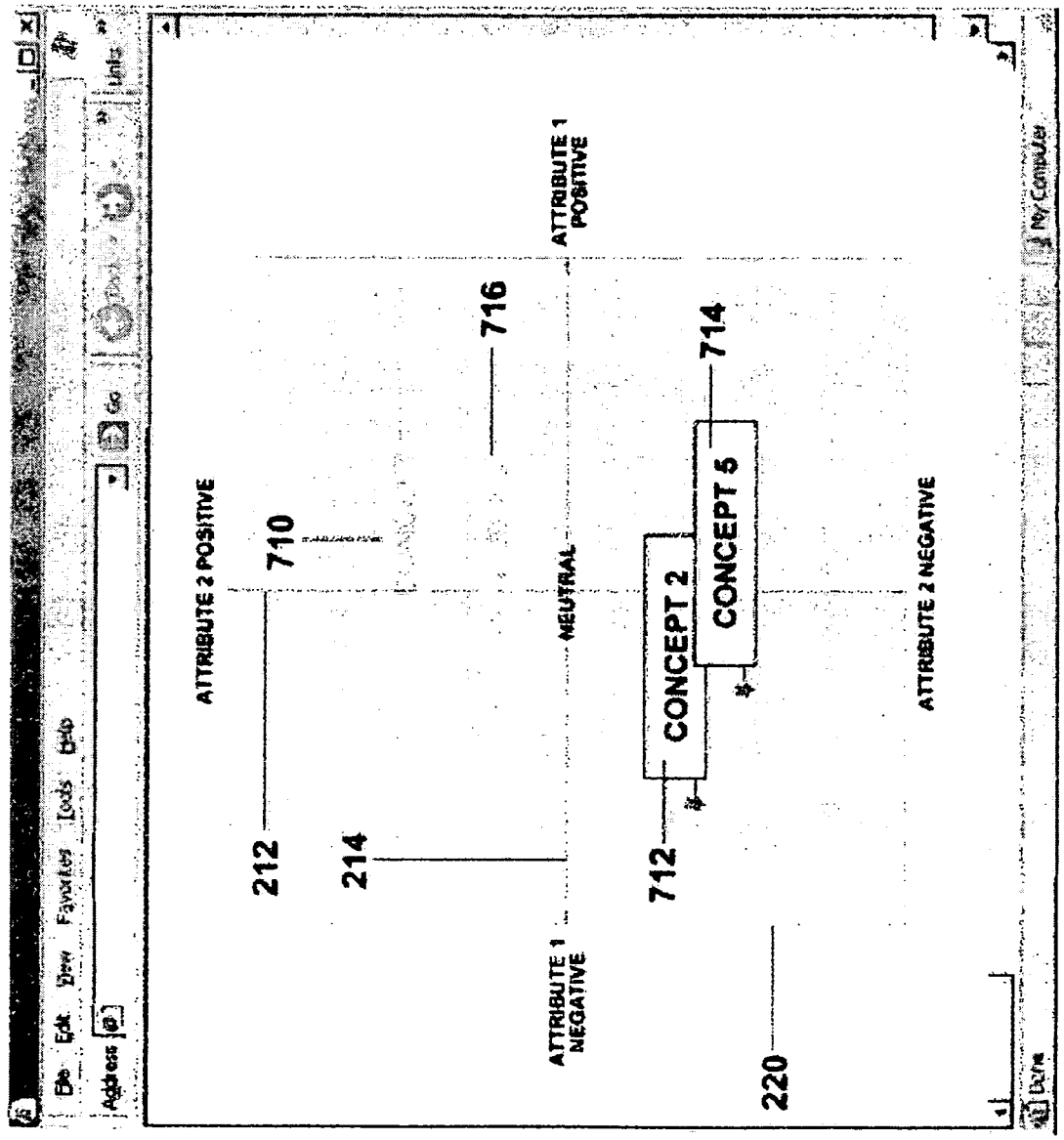
FIG. 7 is another exemplar display, on the rating area shown in FIGS. 2-4, of results of analysis of data collected from a plurality of respondents, with another set of associated representation configuration parameters enabled.
Figure 8:
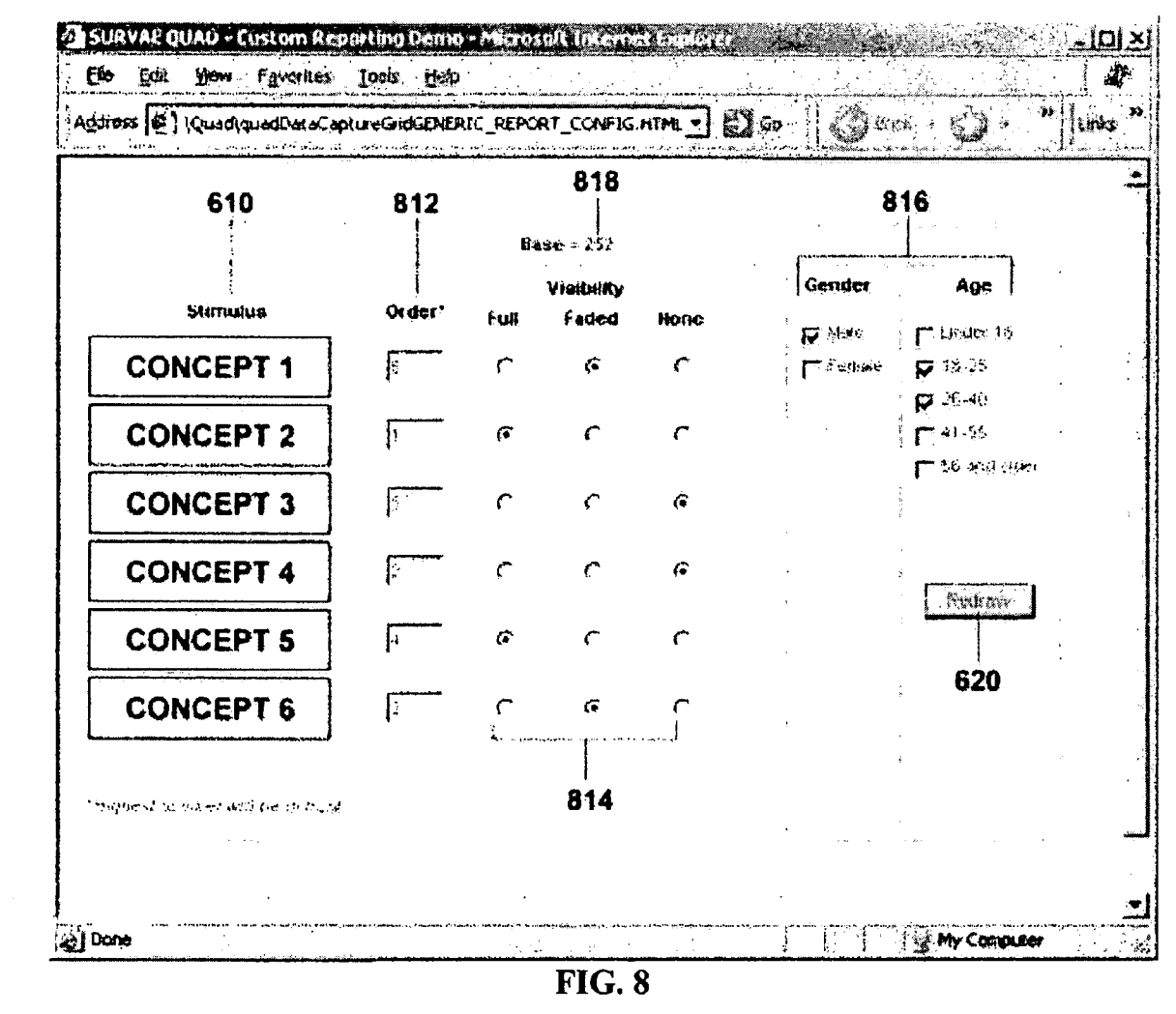

Such a redrawing may be understood by reference to FIGS. 7 and 8. FIG. 8 shows selection of males between 18 and 40 years of age as the segmentation subset 816. This results in 252 respondents, as shown by base 818, in contrast to the 400 respondents shown in FIG. 6 where both genders and all age groups were selected. The researcher has also changed the front-to-back order 812 of display of concepts whose labels overlap, and provided that concept two 712 and concept five 714 will be displayed with full visibility, concept one 710 and concept six 716 will be displayed with faded visibility, and concepts three and four will not be visible on the display, as shown in FIG. 7 when the researcher hits button 620. As with FIGS. 5 and 6, the displayed concept locations represent the average attribute ratings of the selected respondents. As will be appreciated by those skilled in the art, the researcher may select other statistical formulae for use in generating display data, and the research interface shown in FIG. 8 may be modified to facilitate such selection.

Figure 9:
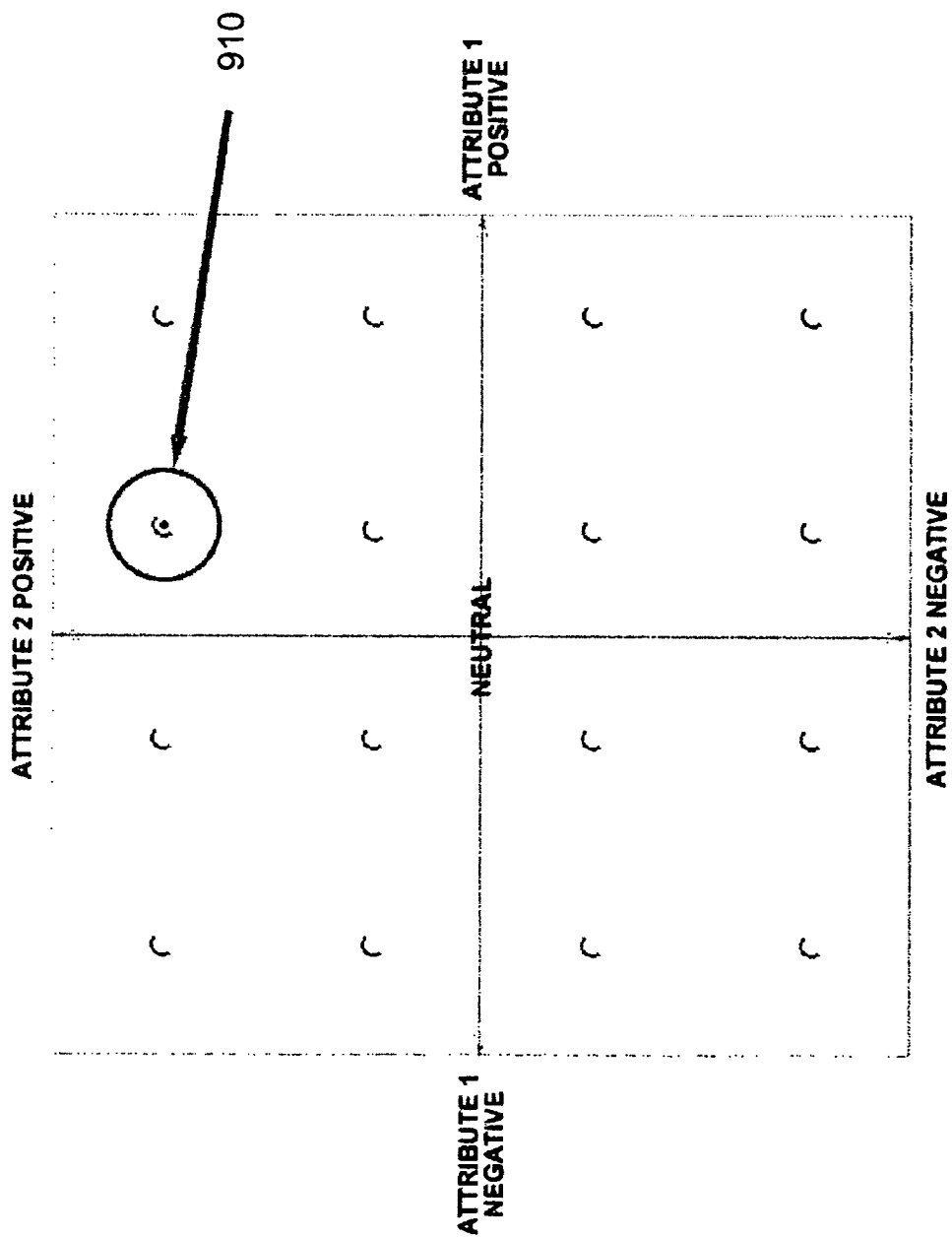
FIG. 9 is a display of an alternative interactive graphical data collection interface using radio buttons.
Figure 10:
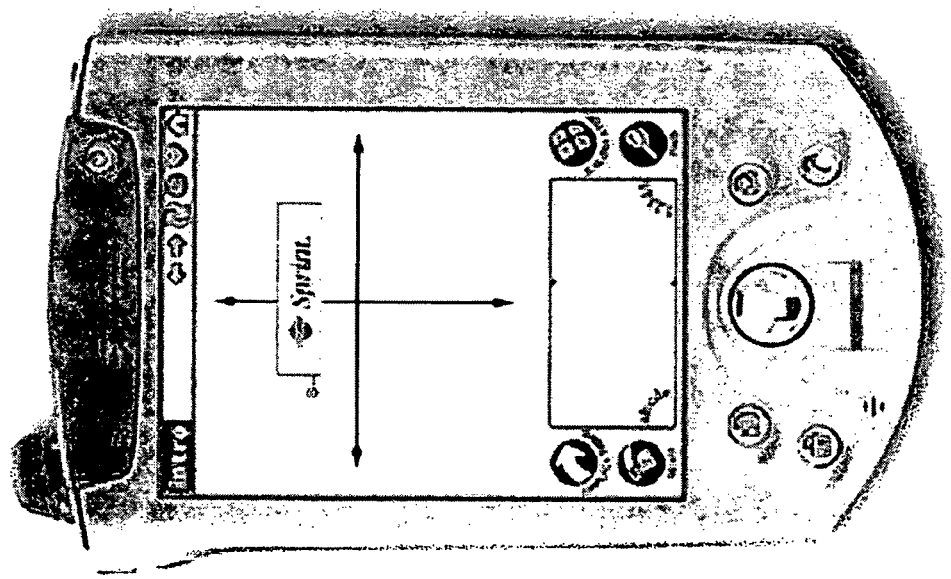
FIG. 10 is a pictorial representation of an interactive graphical data collection interface implemented on a PDA device.

In a further implementation of the graphical user interface for collecting rating data from a respondent, the rating area 220 may be represented as an n×m grid. In this implementation, the interface allows the respondent to locate each concept on a particular grid element. This may be accomplished by selecting a concept from the concept deck (not shown) and then selecting a radio button on a particular grid element (e.g. 910), or by the drag-and-drop procedure described above in connection with FIGS. 2-4. For the purposes of illustration, a four by four grid is shown in FIG. 9, but the size of the grid will depend upon the level of granularity of the data desired by the researcher and the capabilities of devices used to collect the data. FIG. 10 shows implementation of the invention on a personal digital assistant (PDA) device. Depending upon the capabilities of the PDA device, it may be feasible to implement on the PDA device an (x, y) coordinate system as described above. On the other hand, a downloadable program for collecting and then uploading multi-attribute data points may be more compact and therefore more practical if the invention is implemented in the form of a grid.

Additional Embodiments

The interactive respondent data collection graphical user interface may be presented and programmed on a single computer not requiring communication access to a global computer network or remote server and database. Such a single computer may possess all necessary Web services, software applications, and databases within its physical hardware structure and software implementation. Further, such a single computer will allow a researcher to conduct data collection on a sample respondent set in multiple physical locations with no access to a global computer network.

Further, the rating area may be presented to a respondent on a piece of paper whereby the respondent would use a writing instrument to place marks on the rating area in accordance with the concept rating instructions as determined by a researcher. Additionally, the concepts may also be comprised of textual concept descriptions or graphical concept portrayals printed on paper. Furthermore, the concepts may be physically placed on the paper rating area in accordance with the instructions of the researcher. The researcher may then transcribe the physical paper placement concept positions into a computer input device for transmission and storage in a database for subsequent graphical analysis.

While the invention has been described in terms of preferred embodiments, those skilled in the art will recognize that the invention can be practiced with modification within the spirit and scope of the appended claims.

Having thus described my invention, what I claim as new and desire to secure by Letters Patent is as follows:

1. A computer implemented method for collecting respondent ratings, comprising:
   a) presenting a concept to a respondent;
   b) providing a display surface having a rating scale for a first attribute along a first degree of freedom and a rating scale for a second attribute along a second degree of freedom;
   c) enabling the respondent to position a representation of the concept at a point on the display surface, the positioned point simultaneously defining ratings on both first and second attribute rating scales;
   d) using a display deck to present a plurality of concepts in a sequence determined by a researcher, each concept being removed from the deck when positioned on the display surface by the respondent;
   e) displaying an instruction for positioning concept representations on the display surface;
   f) enabling the respondent to submit ratings on the plurality of concepts by selecting a button;
   g) collecting ratings on the plurality of concepts from a plurality of respondents, each respondent being identified by segmentation data;
   h) enabling the researcher to select respondents by categories of said segmentation data;
   i) displaying the number of respondents included within the selected segmentation categories;
   j) enabling the researcher to select a statistical formula for aggregating rating data on the concepts for the selected respondents; and
   k) displaying each concept at a point on the display surface, the display point being defined by the aggregated ratings on the first and second attribute rating scales,
   wherein each of said steps a) through k) are performed by the computer.

2. The method of claim 1, wherein the display surface is a rectangle defined by a horizontal axis corresponding to the first degree of freedom and a vertical axis corresponding to the second degree of freedom.

3. The method of claim 2, wherein the first attribute rating scale is measured by a distance between the positioned point and the vertical axis drawn parallel to the horizontal axis, and the second attribute rating scale is measured by a distance between the positioned point and the horizontal axis drawn parallel to the vertical axis.

4. The method of claim 1, wherein the display surface is a circle having a radius along an axis of the display surface, the first degree of freedom being a length of a line between the positioned point and a center of the circle and the second degree of freedom being an angle measured counterclockwise between the radius and said line.

5. The method of claim 1, wherein the selected statistical formula for aggregating rating data is drawn from the group of: mean, median.

6. The method of claim 1, wherein for at least one respondent ratings are collected from paper forms.

7. The method of claim 1, wherein the categories of segmentation data include gender and age, at least the age category being presented to the researcher as a sequence of age range groupings.

8. The method of claim 1, further comprising:
   l) enabling the researcher to change one or more of the selected segmentation categories and statistical formula; and
   m) redrawing the display on the display surface,
   wherein each of steps l) and m) are performed by the computer.

9. A computer implemented system for collecting respondent ratings, the means for implementation being provided by the computer, comprising:
   a) means for presenting a concept to a respondent;
   b) a display surface having a rating scale for a first attribute along a first degree of freedom and a rating scale for a second attribute along a second degree of freedom;
   c) means for the respondent to position a representation of the concept at a point on the display surface, the positioned point simultaneously defining ratings on both first and second attribute rating scales;
   d) a display deck for presenting a plurality of concepts in a sequence determined by a researcher, each concept being removed from the deck when positioned on the display surface by the respondent;

e) means for displaying an instruction for positioning concept representations on the display surface;

f) means for enabling the respondent to submit ratings on the plurality of concepts by selecting a button;

g) means for collecting ratings on the plurality of concepts from a plurality of respondents, each respondent being identified by segmentation data;

h) means for enabling the researcher to select respondents by categories of said segmentation data;

i) means for displaying the number of respondents included within the selected segmentation categories;

j) means for enabling the researcher to select a statistical formula for aggregating rating data on the concepts for the selected respondents; and k) means for displaying each concept at a point on the display surface, the display point being defined by the aggregated ratings on the first and second attribute rating scales wherein each of a) through k) are provided by the computer.

10. The system of claim 9, wherein the display surface is a rectangle defined by a horizontal axis corresponding to the first degree of freedom and a vertical axis corresponding to the second degree of freedom.

11. The system of claim 10, wherein the first attribute rating scale is measured by a distance between the positioned point and the vertical axis drawn parallel to the horizontal axis, and the second attribute rating scale is measured by a distance between the positioned point and the horizontal axis drawn parallel to the vertical axis.

12. The system of claim 9, wherein the display surface is a circle having a radius along an axis of the display surface, the first degree of freedom being a length of a line between the positioned point and a center of the circle and the second degree of freedom being an angle measured counterclockwise between the radius and said line.

13. The system of claim 9, wherein the selected statistical formula for aggregating rating data is drawn from the group of: mean, median.

14. The system of claim 9, wherein for at least one respondent ratings are collected from paper forms.

15. The system of claim 9, wherein the categories of segmentation data include gender and age, at least the age category being presented to the researcher as a sequence of age range groupings.

16. The system of claim 9, further comprising:

l) means for enabling the researcher to change one or more of the selected segmentation categories and statistical formula; and m) means for redrawing the display on the display surface, wherein each of l) and m) are provided by the computer.

* * * * *